Feb. 28, 1956
R. RUPERT
2,736,375
PROTECTIVE SHIELD FOR VEHICLE
WINDSHIELDS, WINDOWS
AND THE LIKE
Filed April 14, 1952
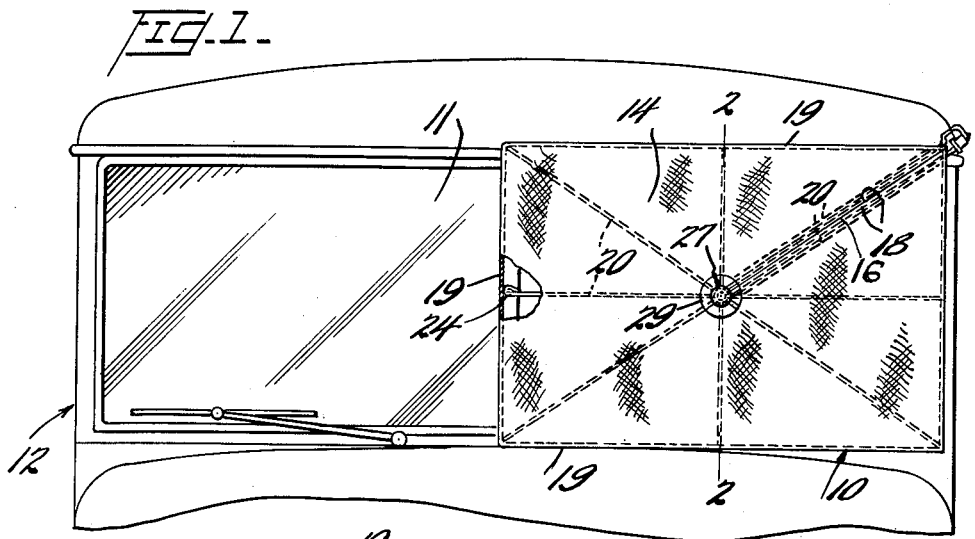
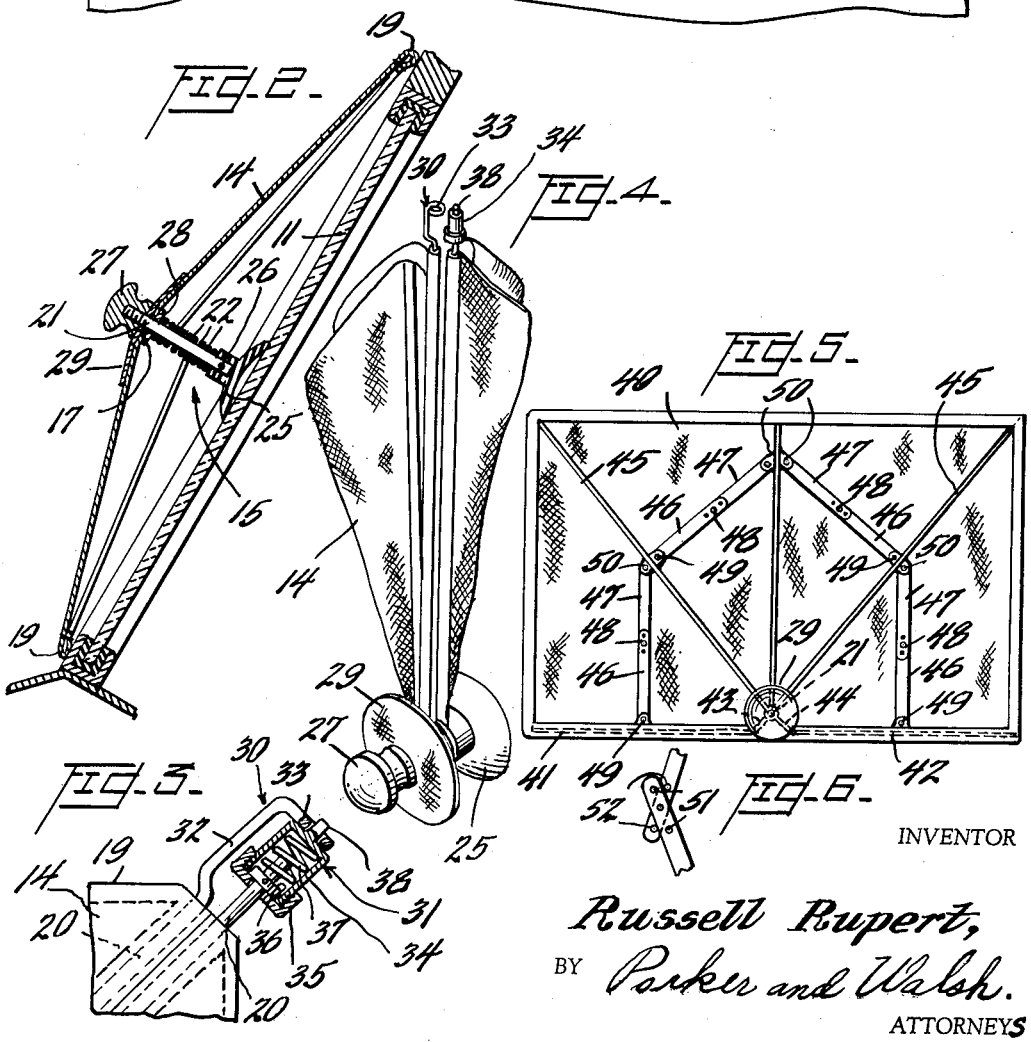
INVENTOR
Russell Rupert,
BY Parker and Walsh.
ATTORNEYS

# United States Patent Office 2,736,375
Patented Feb. 28, 1956

2,736,375

PROTECTIVE SHIELD FOR VEHICLE WINDSHIELDS, WINDOWS AND THE LIKE

Russell Rupert, Cleveland, Ohio

Application April 14, 1952, Serial No. 282,155

5 Claims. (Cl. 160—352)

This invention relates to a protective shield for vehicle windshields, windows and the like and aims generally to improved existing devices of this type.

An important object of the invention is the provision of an improved protective shield for preventing the accumulation of snow, ice, sleet, mud and the like on the windshields and windows of automobiles, trucks, airplanes and the like while they are not in use.

A further object of the invention is the provision of a protective shield for vehicle windshields, windows and the like which is exceedingly simple to manufacture whereby it may be sold at a relatively low cost.

Another object of the invention is the provision of a protective shield for vehicle windshields and windows which may be quickly and easily attached in place over the windshield or window to be protected, and just as easily and quickly detached.

Still another object of the invention is the provision of a protective shield for windshields and windows of automobiles, airplanes and the like, which does not require the use of special fixtures, such as screws, bolts, eyelets, hooks or parts of the vehicle, for example, the doors, to hold the device in place.

Another object of the invention is the provision of a protective shield of the type described which, when not in use, can be folded into a relatively small, compact package and stowed in the vehicle.

These and other objects and advantages of the invention will become more apparent from the following detailed description, taken in connection with the accompanying drawings, describing and illustrating preferred embodiments of the invention.

In the drawings:

Figure 1 is a front view of a portion of an automobile showing the device of the invention applied thereto, Figure 2 is a cross sectional view taken on line 2—2 of Figure 1, Figure 3 is a detailed view, partly in section, showing the catch mechanism for retaining the shield in extended position, Figure 4 is a perspective view of the device of Figure 1 in its folded position, Figure 5 is a view similar to Figure 1, of a modified form of the invention, and Figure 6 is a detailed view of a portion of the collapsible arms for holding the shield of Figure 5 in its extended position.

Referring to Figures 1 to 4, the numeral 10 generally designates one form of protective shield, in accordance with the invention, applied to the right half portion of a divided windshield 11 of a vehicle body 12. The vehicle body 12 may be that of an automobile, truck, airplane or the like, having windshields and/or windows which it is desired to protect.

The protective shield 10 comprises a sheet of flexible material 14 secured to a collapsible or foldable frame 15. The sheet 14 may be formed of any suitable type of material, for example, fabric material, treated or untreated, such as canvas, nylon, silk, oilcloth, rayon, rubberized fabric and the like; or plastic and like materials, which may be suitably formed into films or sheets of the desired strength, such as cellulose acetate, ethyl cellulose, nylon, polyvinyl chloride, rubber and the like. It is not necessary that the sheet of material have substantial thickness. However, it should be relatively strong and of such flexibility that it can be readily folded.

To permit folding of the sheet 14 by the frame 15, as hereinafter described, it is cut along a diagonal line 16 extending inwardly from an outer edge thereof to a centrally disposed opening 17. The adjacent, separable edges formed by the diagonal cut 16, as well as the outer edges of the sheet, may be hemmed as shown at 18 and 19 for increased strength and resistance to tear. In this connection, while the formation of the hems 18 along the cut 16 tends to pull the adjacent edges of the material apart and thus form a gap, the flexibility of the material is usually sufficient so that the material may be stretched sufficiently to close such gap. However, when necessary or desirable, additional strips of material may be secured to the edges of the sheet along the cut 16 for use in forming the hems 18.

The sheet 14 is secured to a plurality of radially extending stays 20 swingably mounted on a central post 21. Two of such stays are arranged adjacent the edges of the sheet formed by the diagonal cut 16 and may desirably be secured to the sheet by the hems 18. The remaining stays are angularly spaced around the central post 21, preferably as shown in Figure 1, and may be secured to the sheet 14 by stitching, adhesively secured supporting straps, or the like.

The stays 20 may desirably comprise rods or wires of relatively small diameter, formed of steel or other suitable material, and provided with inner looped portions 22 for receiving the post 21. The outer ends of the stays 20 are received within the hems 19 of the sheet 14 and may desirably be reversely bent as shown at 24 to provide rounded end portions. If desired, the sheet 14 may be suitably reinforced adjacent the ends of the stays to minimize the possibility of tearing at these points. At one end thereof, the central post 21 is provided with a suction cup 25 secured thereto in any suitable manner, as by the pin 26. The suction cup 25 is adapted for releasable suction engagement with the surface to be protected, for example, the glass windshield 11 shown in Figures 1 and 2.

The end of the post 21, opposite the suction cup 25, extends through the opening 17 in the sheet 14, and has secured thereto a knob or handle 27. The knob 27 is screw-threadedly engaged with the post 21, and in conjunction with the suction cup 25, serves to retain the various elements of the device in assembled relation thereon.

The looped portions of the stays 20 are mounted on the rod 21 in superimposed relation, as clearly shown in Figure 2, the top loop 22 desirably being separated from the sheet 14 by a metal or other type washer 28. The sheet 14 may also be separated from the knob or handle 27 by a fabric or like type washer 29. Such washers minimize wearing and tearing of the sheet 14 adjacent the opening 17 therein thus prolonging the useful life of the device.

The sheet 14 and frame 15 are held in their open or extended positions by locking elements 30 and 31 associated with the stays 20 secured to the sheet 14 adjacent the diagonal cut 16. The locking element 30 is formed by an off-set extension 32 on one of the rods, such extension having the end thereof laterally bent inwardly and looped as shown at 33 to receive a cooperating projection on the locking element 31. The locking element 31 is mounted on an extension of the other stay of the adjacent pair, and may desirably comprise a housing 34 slidably mounted on such extension by a removable end cap 35. Outward movement of the housing 34 is limited by a stop member 36 secured to the extension and adapted to engage the inwardly extending flanged portion of the cap 35. A spring 37 normally urges the housing 34 outwardly to project a pin 38 thereon through the looped portion 33 of the locking element 30. It will be apparent that the locking elements 30 and 31 may be very simply released by pushing the housing 34 inwardly against the action of the spring 37, until the pin 38 is withdrawn from the looped portion 33.

In the modified construction shown in Figures 5 and 6, the post 21 and associated structure, are mounted adjacent a side edge of the sheet 40, but are otherwise the same as previously described, with the exception of the number and arrangement of the stays. In this form of the invention it has been found that five stays are sufficient to hold the sheet 40 in its extended position. Two of the stays, namely, the stays 41 and 42, are secured to a side edge of the sheet as by stitching or hemming the edges of the sheet around the stays. The stays 41 and 42 are provided at their inner ends with laterally bent inwardly extending portions 43 and 44 which are looped at their inner ends, as previously described, to receive the post 21. The remaining stays 45 are angularly spaced from the stays 41 and 42, in the manner shown in Figure 5, and are secured to the sheet 40 in any suitable manner, as by stitching.

The sheet 40 and stays 41, 42 and 45, are held in open or extended position, by locking arms 46 and 47. At their inner ends the locking arms 46 and 47 are pivotally connected together as at 48. At their outer ends these arms are pivotally connected to the respective stays 41, 42 and 45, as shown at 49 and 50. Adjacent the pivotal connections 48 the arms 46 and 47 are provided with cooperating openings or indentations 51 and projections 52. These serve to releasably retain the arms 46 and 47 in the aligned positions shown in Figure 5 to thereby hold the stays in open position.

*Operation*

The protective shield devices of the invention have thus far been described in their open or extended positions. In order to fold the device of Figures 1 to 4 from its open or extended position shown in Figure 1 to its folded position shown in Figure 4, it is merely necessary to push inwardly on the locking element 31 to release it from the locking element 30, and then swing the stays 20 to bring them into adjacent, substantially aligned relationship. This may be accomplished by holding one of the pairs of stays 20 adjacent the diagonal cut 16 stationary, and swinging the other stay in a direction away from the first mentioned stay through an angle of substantially 360°. During such movement of the other stay, the intermediate stays 20 will, of course, be picked up successively to move therewith. Alternatively, both of the stays 20 adjacent the diagonal cut 16 may be moved in opposite directions to bring them into substantial alignment with each other and the remaining stays at any desired intermediate position. It will be apparent that during such movement of the stays 20 the sheet 14 will be folded as clearly shown in Figure 4.

The above indicated manner of folding the device of Figures 1 to 4 is based on a construction in which all of the stays 20 are swingably mounted on the central post 21. However, folding may also be accomplished in a satisfactory manner by fixing one of the stays 20 adjacent the diagonal cut 16 to the post 21 and swingably mounting the others. With this type of construction, of course, the other stays are swung in the proper direction until they are all in substantial alignment with the fixed stay. Such construction may also be used in connection with the embodiment of the invention shown in Figures 5 and 6.

In folding the device of Figure 5 it is first necessary to move the locking arms 46 and 47 out of alignment. This may be accomplished by pushing inwardly, or outwardly, on the arms adjacent the pivotal connections 48 to move the cooperating indentations 51 and projections 52 out of engagement. The end stays 41 and 42 and intermediate stays 45 are then swung inwardly toward the central stay 45 until they are in substantial alignment therewith. It will be noted that in the construction of Figure 5 the sheet 40 is formed in one piece and is not required to have a diagonal cut such as that shown at 16 in Figure 1.

In its folded position, the protective shield device of the invention forms a relatively small compact bundle which may be readily stowed in any desired location in the automobile or other vehicle. In order to protect the device and to catch water, ice and the like which has accumulated thereon during use, a plastic bag or like waterproof container may be provided, in which the device may be kept when not in use.

The device is preferably applied to the windshield, window or other surface to be protected, in the open or extended positions shown in Figures 1 and 5. This is very easily accomplished by grasping the handle 27, positioning the device over the surface to be protected with the suction cup in engagement therewith, and then pressing inwardly on the handle 27 to expel air from beneath the suction cup and releasably engage same with the surface. This securely holds the device in position over the surface to be protected until it is subsequently removed as hereinafter described. While so positioned snow, ice and the like collect on the sheet 14 and are thereby prevented from reaching the surface to be protected, such as the windshield 11 in Figure 1.

When it is desired to use the vehicle, the protective shield is easily released merely by pulling outwardly on the handle 27 to break the suction of the suction cup 25. The shield is then removed with the snow, ice or the like caked thereon and is vigorously shaken or otherwise manipulated to remove the same. When the snow and ice have been substantially removed the device may then be folded, as previously described, placed in a bag or other container, and stowed in the vehicle.

It will thus be seen that the present invention provides an improved protective shield of simple and economical construction which can be easily and quickly installed and removed by even the most unskilled person. It does not require special fittings of any description for holding it in place and it does not mar or otherwise damage the surface to which it is applied. After use, it is only necessary to remove sufficient ice, and the like, to permit folding of the device into a small compact bundle. It may then be placed in a waterproof bag or other container and stowed in the vehicle without danger of water and ice falling therefrom into the vehicle.

The device of the invention is particularly useful in preventing the accumulation of ice, snow and the like on the windshield and windows of vehicles, thereby insuring a quick get-away and eliminating the necessity of starting the motor to heat the interior of the car prior to scraping or otherwise removing the ice and snow. The device is also useful in protecting windshields and windows of vehicles against the effects of sunlight. The device is further useful in covering the windshields of trucks and other vehicles in a war zone, to prevent the rays of the sun from being reflected and thereby giving away the position of the vehicle to enemy aircraft.

The protective shield may be made in any desired shape and size to correspond to the surface to be protected. In the embodiments of the invention illustrated the shield is shown as rectangular and of a size to cover one-half of a divided windshield. However, it will be appreciated that the shield may be of any desired shape and size and that it may be used singly or in multiples, as required, to cover the surface which it is desired to protect.

While preferred embodiments of the invention have

I claim:

1. A protective shield for vehicle windshields, windows and the like, comprising a sheet of foldable material having opposite, substantially straight lateral edges and intervening corners, a post extending through said sheet of material and having a vacuum cup on one end thereof adapted to be secured to a surface to be protected, a plurality of stays swingably mounted on said post and secured to said sheet, some at the corners and others at intermediate portions of said edges, said stays having varying lengths, the outer ends thereof terminating the associated corners and edges of said sheet to hold the same extended, the outer ends of said stays being disposed in substantially the same plane as said vacuum cup whereby when said sheet is in extended position and applied to a surface to be protected, the lateral edges thereof will engage such surface.

2. Apparatus of the type set forth in claim 1 wherein said sheet is substantially rectangular in shape when extended, said post extending through an opening in said sheet substantially centrally thereof, said sheet being provided with a slit extending from said opening to a corner thereof, two of said stays being secured to the respective opposed edges of the sheet formed by said slit, and means for releasably securing said two stays together to hold the sheet in extended position.

3. Apparatus of the type set forth in claim 1 wherein the post extends through an opening in said sheet adjacent one edge thereof and intermediate the ends of same edge, one of said stays being secured to said sheet along a portion of said edge at one side of said opening, another of said stays being secured to said sheet along the portion of said edge on the other side of said opening, the remainder of said stays being secured to said sheet along intermediate portions thereof angularly spaced from said edge, and means for retaining said stays in their angularly spaced positions to hold said sheet extended.

4. A protective shield for vehicle windshields, windows and the like, comprising a sheet of foldable material, a post extending through said sheet of material, a plurality of stays mounted on said post and secured to spaced portions of said sheet, said stays being swingable on said post to move the sheet between folded and extended positions, said sheet having oppositely disposed straight edges and intervening corners in its extended position, some of said stays extending to the corners of said sheet and others to portions of said eges intermediate the corners, said stays terminating at the associated edges and corners of the sheet, the edges of said sheet being substantially straight and in a common plane when the sheet is in extended position, and a vacuum cup mounted on one end of said post for securing the shield to a surface to be protected in said plane, the edges of said sheet and the vacuum cup being disposed in substantially the same plane.

5. In a protective shield for vehicle windshields, windows and the like comprising a foldable sheet of material having a lateral edge, an opening disposed adjacent said edge and a post extending through said opening; a series of stays rotatably mounted on said post and extending outwardly therefrom, one of said stays being secured to said sheet along a portion of said lateral edge at one side of said opening, another of said stays being secured to said sheet along another portion of said lateral edge on the other side of said opening, the remaining stays of the series being secured to said sheet along intermediate portions thereof angularly spaced from said lateral edge, said stays being swingable on said post between substantially aligned and angularly spaced positions for moving said sheet between folded and extended positions, and means for retaining said stays in their angularly spaced positions to hold said sheet extended, said last named means comprising sectional locking arms each pivotally connected to adjacent stays and the sections of each arm pivotally connected to each other, and means associated with said arms for releasably holding them in aligned positions.

References Cited in the file of this patent

UNITED STATES PATENTS

| | | |
|---|---|---|
| 198,792 | Cain | Jan. 1, 1878 |
| 522,265 | Marqua | July 3, 1894 |
| 1,349,281 | King | Aug. 10, 1920 |
| 2,496,501 | Staunton | Feb. 7, 1950 |